B. H. HAMILTON.
OIL GUARD.
APPLICATION FILED NOV. 1, 1906.

1,019,460.

Patented Mar. 5, 1912

Witnesses:
George J. Thornton
Marcus L. Byng

Inventor,
Brace H. Hamilton,
By Albert G. Davis
Atty.

UNITED STATES PATENT OFFICE.

BRACE H. HAMILTON, OF LYNN, MASSACHUSETTS, ASSIGNOR TO GENERAL ELECTRIC COMPANY, A CORPORATION OF NEW YORK.

OIL-GUARD.

1,019,460.      Specification of Letters Patent.      Patented Mar. 5, 1912.

Application filed November 1, 1906. Serial No. 341,586.

*To all whom it may concern:*

Be it known that I, BRACE H. HAMILTON, a citizen of the United States, residing at Lynn, county of Essex, State of Massachusetts, have invented certain new and useful Improvements in Oil-Guards, of which the following is a specification.

In the construction of dynamo electric machines it is desirable to locate one or both bearings close to the revolving member to reduce the longitudinal dimension of the machine. To cool the machine, said member is provided with one or more air passages or ducts through which an active circulation of air is maintained, the air entering at one or more points near the shaft and discharging at the periphery. Owing to the close proximity of the parts the rotation of the armature sucks oil mixed with air from the bearing and discharges it into and through the ducts in said rotating member and into the stationary member surrounding it.

My invention has for its object to overcome the objection referred to without, however, increasing the longitudinal dimension of the machine.

Figure 1:
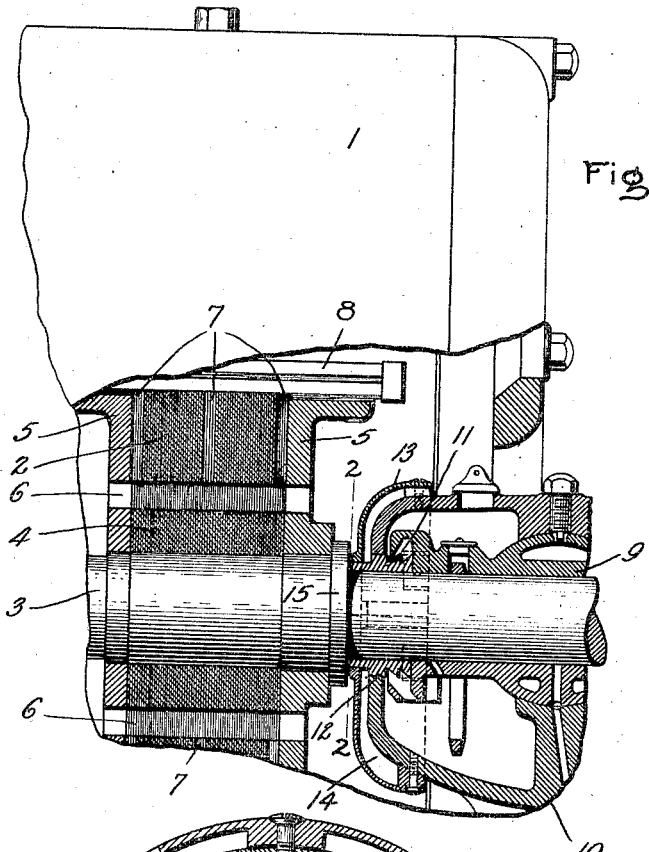
Figure 2:
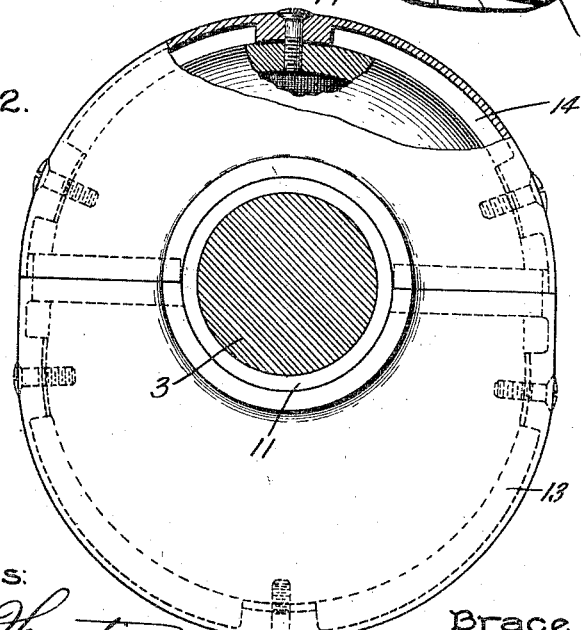

In the accompanying drawing which illustrates one of the embodiments of my invention, Figure 1 is a partial view of a dynamo electric machine with certain of the parts in section, and Fig. 2 is a sectional view taken on line 2 2 of Fig. 1.

1 represents the casing of a dynamo electric machine provided with suitable pole pieces and windings therefor.

The invention is applicable to alternating or direct current machines and the specific construction of the field magnet and the armature are immaterial.

2 in this instance represents the revolving member of the machine and 3 the shaft therefor. The revolving element is made of laminated magnetic material 4 with heavy end heads 5 that serve to clamp the laminæ and hold the same in a fixed position on the shaft. Extending axially through the laminæ and the heads are one or more passages 6 through which air for cooling is drawn and discharged through the radial passages 7, the latter being formed by suitable space blocks located between adjacent bundles of laminæ and between the laminæ and the end heads. The periphery of the revolving member is provided with windings 8 of any approved construction.

The armature shaft is mounted in a suitable journal box 9 carried by the bearing 10. Only one bearing is shown, but it is to be understood that two bearings are or may be provided. I may make the second bearing the same or different from the one illustrated; it will depend chiefly upon whether or not it will be in the same position with respect to the armature as the one shown. On the shaft is a collar 11 forming a part of an oil thrower to prevent the oil from working out of the bearing into the revolving element of the dynamo. As a further precaution the collar is provided with a cylindrical portion 12 that makes a close fit with the surrounding portion of the bearing. I have found that in spite of the oil thrower and the close fit between the bearing and the cylindrical portion 12, that oil will be sucked out from the bearing and discharged into and through the passages 6 and 7. This is caused by the fact that the air pressure just outside of the bearing and immediately surrounding the shaft, is lower than that within the bearing due to the rapid rotation of the revolving member which acts like a centrifugal fan and causes air to be drawn away from the inner end of the bearing. In order to prevent this I have discovered that it is necessary to maintain around the outside of the bearing and adjacent the revolving member, a region wherein the pressure is the same or substantially the same as that of the air within the bearing. In any event it must not be appreciably less, but it can be somewhat higher. To accomplish this a shield 13 is provided, of suitable shape to inclose the inner end of the bearing. This shield may have any desired shape, but commonly it would be shaped to conform with the end of the bearing. The shield may be made in one, two or more pieces as best suits the machine to which it is applied. In the present case it is made in two parts, an upper and a lower, so that when the cover of the bearing is taken off, the upper half of the shield is taken off with it. The parts of the shield are fastened in place by screws or other suitable means, and between the inner surface of the shield and the inner surface of the bearing are one or more air spaces 14, the entrance of which extends far enough away from the revolving element so that the entrance of air into the spaces creates a static pressure therein and thus causes the air pressure around the outside of the bearing and adjacent the revolving member to be the same, or substantially the same, as the air within the bearing; or, in other words, the velocity head of the air about the bearing is transformed into a static head near the inner end of said bearing. The shield is provided with a central opening through which the shaft extends and the clearance between the shaft and the wall of the opening is made as small as possible so as to restrict any tendency for oil and air to be sucked out of the bearing due to the action of the armature. This tendency is further decreased by extending the shield into close proximity with the collar 15 mounted on the armature shaft.

It is to be understood that my invention is not necessarily limited to dynamo electric machines since it will be useful wherever the conditions are similar to those described, for example it is especially useful in connection with bearings on centrifugal fans.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In combination, a shaft, a bearing supporting said shaft, a revolving element mounted on said shaft, said element by its rotation drawing air into itself over said bearing, and means forming a space for transforming the velocity head of the air drawn over said bearing and before it is drawn into said element into a static head near the inner end of said bearing to prevent said element from withdrawing lubricant from the bearing.

2. A revolving element which by its rotation produces an air circulation, a shaft for said element in combination with a bearing supporting the shaft therefor, and a shield for the end of the bearing, said shield being bent away from said revolving element so as to form a space in which the velocity head of the air is transformed into a static head to prevent said element from withdrawing air and lubricant from said bearing.

3. In combination, a shaft, a revolving element which by its rotation produces an air circulation, the suction taking place near the shaft and the discharge at a point remote therefrom, a bearing for said shaft in close proximity to the revolving member, and means bent away from said revolving element for transforming the velocity head of the air drawn over said bearing into a static head which is great enough to prevent lubricant from being withdrawn from the bearing by said member.

4. In combination, a revolving element which by its motion produces a circulation of air, the direction of flow being outward from the shaft, a supporting shaft, a bearing having a throttled opening through which the shaft extends to restrict the escape of lubricant, and a shield bent away from said revolving element located between one end of the bearing and the revolving element and arranged to maintain a static air pressure between it and said bearing which is substantially equal to that within the latter, thereby preventing said element from sucking air charged with lubricant out of the bearing.

5. In an apparatus of the character described, the combination of relatively rotating elements, a shaft for one of said elements, a bearing supporting the shaft, and a divided shield bent away from said elements, supported by the parts of the bearing and located between it and the revolving element, said shield forming spaces in which the velocity head of the air drawn over said bearing is transformed into a static head to prevent air charged with lubricant from being withdrawn and discharged into and through one of said elements.

6. In combination, a revolving element which by its rotation produces an air circulation, a shaft, a bearing therefor in proximity to the revolving element and past which air is drawn, and means bent away from said revolving element for transforming the velocity head of said air draft into static pressure to prevent lubricant from being withdrawn from the bearing by said element.

7. In combination, a revolving element which by its rotation draws air into itself, a shaft, a bearing therefor in proximity to the revolving element and past which air is drawn, and means bent away from said revolving element for transforming the velocity head of said air draft before it is drawn into said element into static pressure to prevent lubricant from being withdrawn from the bearing by said element.

In witness whereof, I have hereunto set my hand this thirtieth day of October, 1906.

BRACE H. HAMILTON.

Witnesses:
JOHN A. McMANUS, Jr.,
HENRY O. WESTENDARP.